US008657677B2

(12) United States Patent
Jahanshahi et al.

(10) Patent No.: US 8,657,677 B2
(45) Date of Patent: Feb. 25, 2014

(54) CLIENT ACCOUNT MANAGING ARRANGEMENT ON AN ONLINE GAMING SYSTEM

(75) Inventors: Jahanshah Jahanshahi, Stockholm (SE); Henrik Lagercrantz, Uppsala (SE)

(73) Assignee: Ongame Services AB, Stockholm (SE)

( * ) Notice: Subject to any disclaimer, the term of this patent is extended or adjusted under 35 U.S.C. 154(b) by 123 days.

(21) Appl. No.: 13/266,969

(22) PCT Filed: Apr. 28, 2009

(86) PCT No.: PCT/SE2009/050455
§ 371 (c)(1),
(2), (4) Date: Feb. 10, 2012

(87) PCT Pub. No.: WO2010/126411
PCT Pub. Date: Nov. 4, 2010

(65) Prior Publication Data
US 2012/0129591 A1   May 24, 2012

(51) Int. Cl.
*A63F 13/10*   (2006.01)
*A63F 13/12*   (2006.01)

(52) U.S. Cl.
CPC ............. *A63F 13/10* (2013.01); *A63F 13/12* (2013.01); *A63F 2300/554* (2013.01); *A63F 2300/5546* (2013.01)
USPC ............................................. 463/29; 463/42

(58) Field of Classification Search
CPC ................. A63F 2300/554; A63F 2300/5546; A63F 2300/50; A63F 2300/513; A63F 2300/514; A63F 2300/5513; A63F 2300/407; A63F 13/12; A63F 13/02; A63F 2300/5526; A63F 2300/636; A63F 2300/553; H04N 21/222; H04W 88/182; H04W 4/18; H04W 80/10; H04M 15/8228; H04M 2215/7833; G05B 2219/31242; G05B 2219/31241; G06F 11/2074; G06F 15/7825; G06F 17/30578; G06F 12/14; G06F 21/121; G06F 21/30; G06Q 20/40; G06Q 20/02
USPC ............. 463/25, 29, 40–42; 726/12; 707/613, 707/658
See application file for complete search history.

(56) References Cited

U.S. PATENT DOCUMENTS 5,779,549 A * 7/1998 Walker et al. .................... 463/42
5,873,085 A * 2/1999 Enoki et al. .......................... 1/1

(Continued)

OTHER PUBLICATIONS

European Search Report, dated Mar. 6, 2013, in European Application No. 09844113.2.

*Primary Examiner* — David L Lewis
*Assistant Examiner* — Matthew D. Hoel
(74) *Attorney, Agent, or Firm* — Nixon & Vanderhye P.C.

(57) ABSTRACT

A client account managing arrangement on an online gaming system includes a game server system having at least one game logic managing clients participating in at least one game session. Each client has a permanent account on an accounting system. Proxies, one for each client/game session combination, are connected to the respective game logics. An asynchronous communication server system is connected to the proxies. The accounting system is connected to the asynchronous communication server system and is configured to i) create a temporary reservation account for each client/game session combination, ii) transfer money from the permanent accounts to the respective temporary reservation accounts as clients start to participate in game sessions, iii) update the temporary reservation accounts during ongoing game sessions, iv) transfer remaining money from the temporary reservation accounts to the respective permanent accounts as clients end their participation in game sessions, v) closing the temporary reservation accounts for each ended client/game session combination.

12 Claims, 4 Drawing Sheets

(56) References Cited

U.S. PATENT DOCUMENTS

| | | | |
|---|---|---|---|
| 6,222,856 B1* | 4/2001 | Krishnan et al. | 370/468 |
| 6,224,486 B1* | 5/2001 | Walker et al. | 463/42 |
| 6,721,288 B1* | 4/2004 | King et al. | 370/310 |
| 6,917,960 B1* | 7/2005 | Decasper et al. | 709/203 |
| 7,240,100 B1* | 7/2007 | Wein et al. | 709/214 |
| 2002/0002074 A1 | 1/2002 | White et al. | |
| 2002/0064267 A1* | 5/2002 | Martin et al. | 379/201.01 |
| 2002/0113995 A1 | 8/2002 | Evans et al. | |
| 2002/0194498 A1* | 12/2002 | Blight et al. | 713/201 |
| 2003/0005181 A1* | 1/2003 | Bau et al. | 709/330 |
| 2003/0187631 A1* | 10/2003 | Masushige et al. | 703/27 |
| 2004/0133445 A1* | 7/2004 | Rajan et al. | 705/1 |
| 2006/0075120 A1* | 4/2006 | Smit | 709/227 |
| 2007/0025327 A1* | 2/2007 | Raciborski et al. | 370/351 |
| 2007/0202941 A1 | 8/2007 | Miltenberger et al. | |
| 2007/0233615 A1* | 10/2007 | Tumminaro | 705/75 |

* cited by examiner

CLIENT ACCOUNT MANAGING ARRANGEMENT ON AN ONLINE GAMING SYSTEM

This application is the U.S. national phase of International Application No. PCT/SE2009/050455 filed 28 Apr. 2009 which designated the U.S. and the entire contents of each of which are hereby incorporated by reference.

TECHNICAL FIELD

The technology relates generally to online gaming systems, and especially to monetary transaction handling on such systems.

BACKGROUND

During an ongoing online gaming session, for example a poker game, the requirements on handling of the monetary transactions towards the (backend) accounting system are rather severe. The requirements on consistency, availability and latency towards the accounting system should be so high that the gaming session is able to provide a continuous, pleasant and real time experience for the client (end user, player). If the game logic has to wait for all the transactions to go through at the end of a round or session, and to make sure that all transactions are stored in the backend system before continuing with the next round or session, the clients will experience a lot of waiting time. For systems with millions of ongoing sessions this means limitations on performance and sometimes service degradation. If the game logic and the accounting system are geographically distanced from each other, for example if the game logic is installed in North America and the accounting system in Europe, the latency and network disturbances will also be an important issue.

SUMMARY

An object is an improved client account managing arrangement on an online gaming system.

This object is achieved in accordance with the attached claims.

Briefly, this client account managing arrangement (or system) on an online gaming system includes a game server system having at least one game logic managing clients participating in at least one game session, each client having a permanent account on an accounting system. Proxies, one for each client/game session combination, are connected to the respective game logic. An asynchronous communication server system is connected to the proxies. The accounting system is connected to the asynchronous communication server system and is configured to:

1) create a temporary reservation account for each client/game session combination,
2) transfer money from the permanent accounts to the respective temporary reservation accounts as clients start to participate in game sessions,
3) update the temporary reservation accounts during ongoing game sessions,
4) transfer remaining money from the temporary reservation accounts to the respective permanent accounts as clients end their participation in game sessions,
5) close the temporary reservation account for each ended client/game session combination.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the figures of the following description connections between different entities, such as clients and servers, servers and other servers, etc will be illustrated as separate logical connections to facilitate associations between ingoing signal to and outgoing signals from such entities. However, in reality the actual connections may be multiplexed on fewer inputs and outputs.

Figure 1:
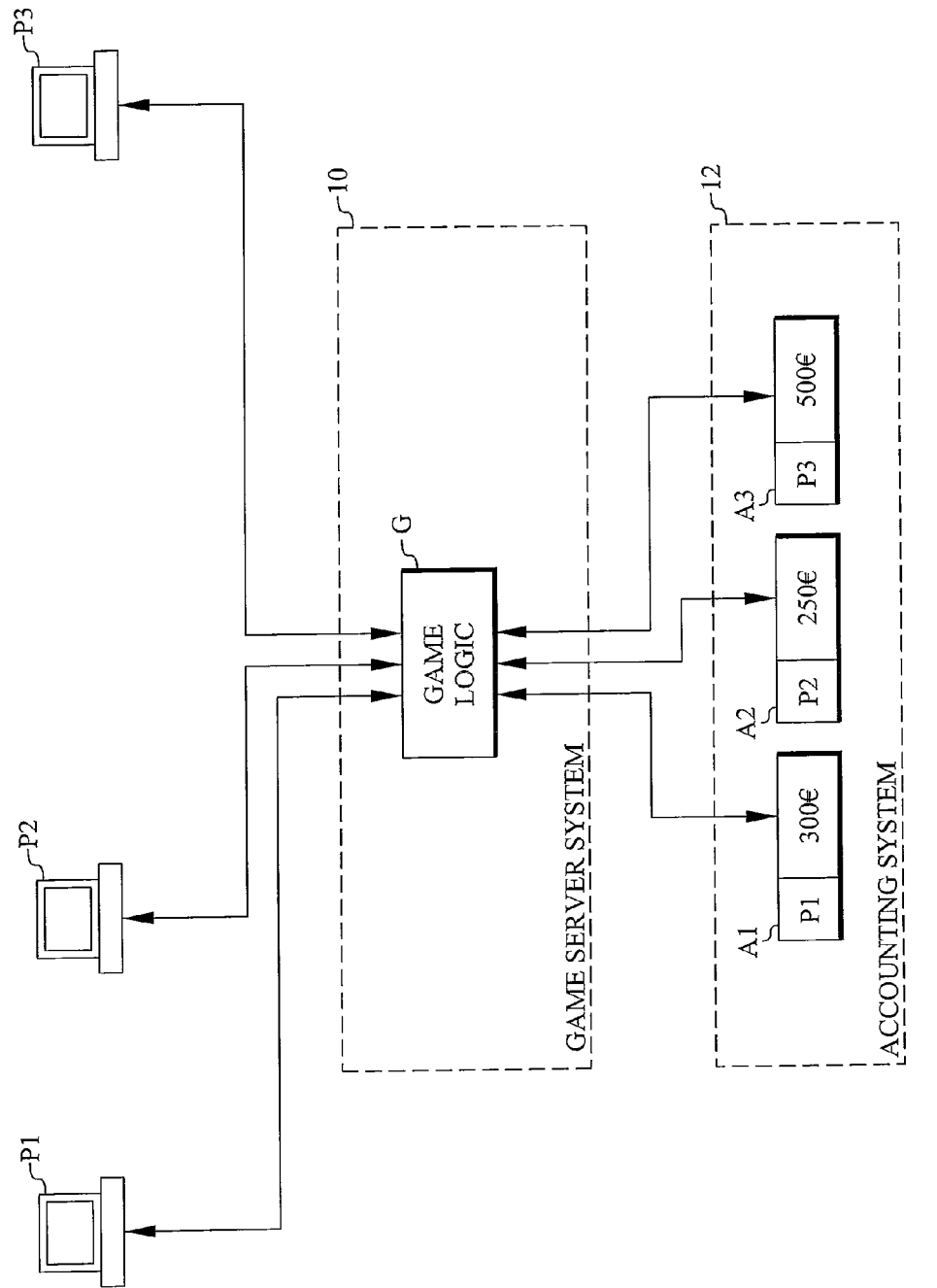
FIG. 1 is a block diagram of a prior art gaming system in a first scenario.

FIG. 1 is a block diagram of a prior art gaming system in a first scenario. In this first scenario a number of clients (players) P1, P2, P3 are connected to the game logic G of a game server system 10 over the internet. The game logic manages the interactive game in which the clients participate, for example poker. The game logic reacts on mouse clicks and commands keyed in by the clients and updates the screens seen by the clients accordingly. The game logic is also connected to a backend including an accounting system 10 with accounts A1, A2, A3 associated with the corresponding clients P1, P2, P3. The accounting system is typically geographically separated from the game server system and the connection is implemented over the internet. The accounts have to be updated at the end of a round or session. If this update is to be reliable, the game logic has to wait for all the transactions to go through at the end of a round or session, and to make sure that all transactions are stored in the accounts before it can proceed with the next round or session. This implies that the clients will experience undesirable waiting times. For systems with hundreds of thousands or millions of ongoing sessions this will result in limitations on performance and sometimes service degradation.

Since the accounting system may also need to access the accounts, for example for billing purposes or for collecting data for statistics, accounts may be locked when the game logic intends to perform an update, which may increase waiting times.

Figure 2:
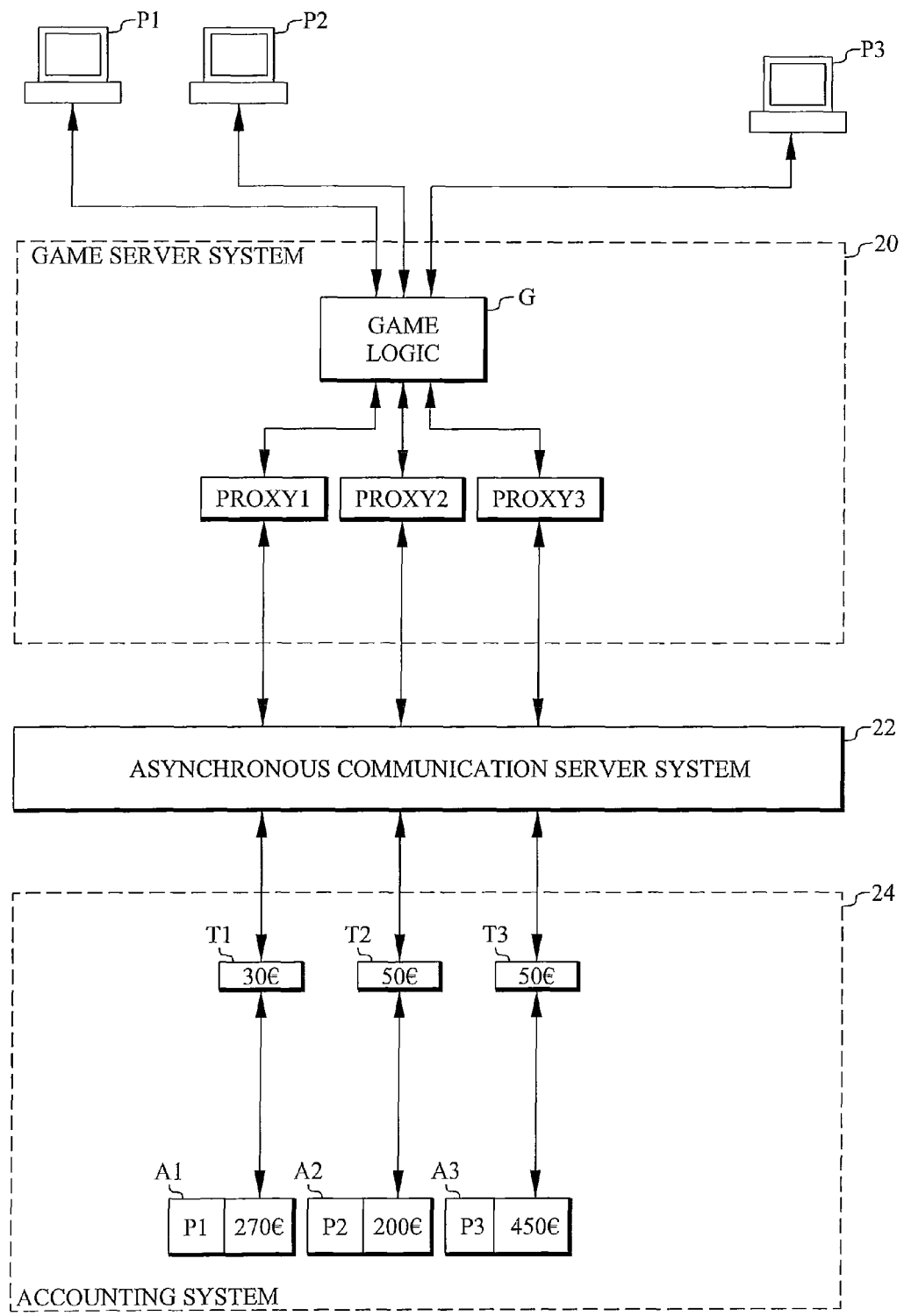
FIG. 2 is a block diagram of a gaming system including an example embodiment of the client account managing arrangement.

FIG. 2 is a block diagram of a gaming system including an example embodiment of the client account managing arrangement. The scenario is the same as in FIG. 1 with clients P1, P2, P3 having accounts A1, A2, A3 participating in a game on game logic G. However, according to this embodiment a game server system 20 includes, in addition to the game logic G, a number of proxies PROXY1, PROXY2, PROXY3, each associated with a corresponding client P1, P2, P3. These proxies are connected between the game logic G and an asynchronous communication server system 22. Through the asynchronous communication server system 22 the proxies PROXY1, PROXY2, PROXY3 are connected to temporary reservation accounts T1, T2, T3 associated with the respective clients P1, P2, P3. The temporary reservation accounts T1, T2, T3 are in turn connected to permanent accounts A1, A2, A3.

The arrangement in FIG. 2 operates as follows: When a client, for example P1, enters a game session managed by game logic G, the accounting system 24 creates a temporary reservation account T1. It then transfers an amount of money, for example 30 €, from the permanent account A1 to the temporary reservation account T1. As long as client P1 participates in the game, game logic G does not communicate with the permanent account A1, but rather with the temporary reservation account T1 over the proxy PROXY1 and the asynchronous communication server system 22 (including one or several asynchronous communication servers). In this way the temporary reservation account T1 is updated during the progress of the game (if the temporary reservation account T1 is emptied during the game, another reservation from the permanent account A1 may be triggered; this can be handled by the accounting system without involving the game logic). When client P1 leaves the game session, the accounting system 24 transfers the money remaining in the temporary reservation account T1 to the permanent account A1. Thereafter it closes (or removes, destroys) the temporary reservation account T1. The other clients are handled similarly.

The purpose of the proxies and corresponding temporary reservation accounts is to give each game (there may be several as will be discussed below with reference to FIGS. 3 and 4) its own account context. In this way the communication towards the client's permanent account is reduced to reserving money to a temporary reservation account and flushing it back when the reservation account is closed (when the client leaves the game session). Thus, the combination of proxies with temporary reservation accounts essentially decouples the permanent accounts from the game logic, thereby making them more accessible for other duties of the backend accounting system.

The purpose of the asynchronous communication server system is to ensure that transactions made to the proxies are sent to and reach the temporary reservation accounts without involving the game logic. Thus, the middle layer formed by the asynchronous communication server system essentially decouples the flow of the game from the temporary reservation accounts, thereby enabling the game logic to focus its resources on improving the game flow perceived by the clients.

By combining the features described in the previous two paragraphs, one obtains an online gaming system in which the game logic is essentially decoupled from the accounting system.

Figure 3:
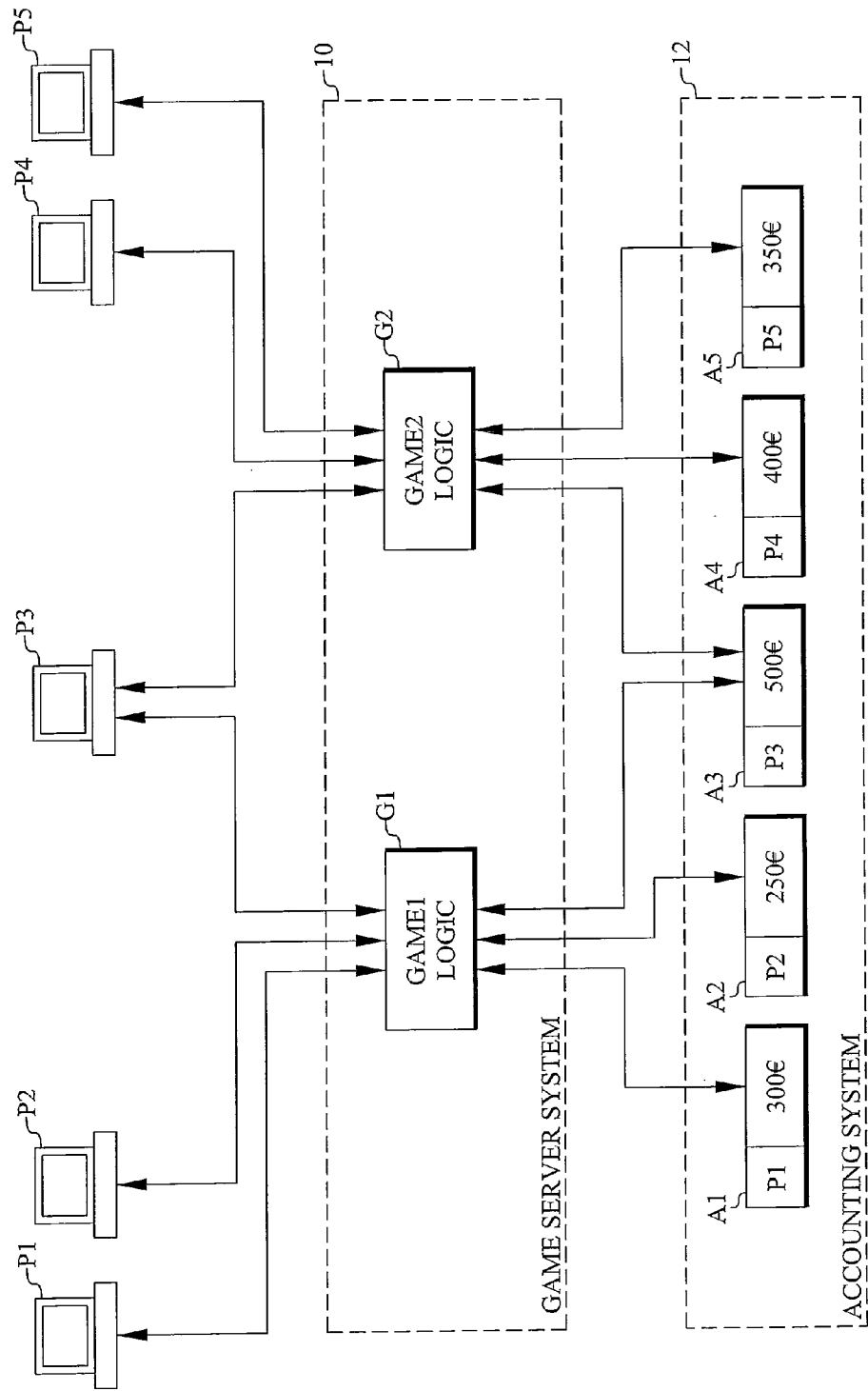
FIG. 3 is a block diagram of a prior art gaming system in a second scenario.

FIG. 3 is a block diagram of a prior art gaming system in a second scenario. In this scenario clients P1, P2, P3 participate in a first game GAME1 on game logic G1, and clients P3, P4, P5 participate in a second game GAME2 on game logic G2. It should especially be noted that client P3 participates in both games. The games may be the same game, for example both games may be poker games, but the games may also be different, for example GAME1 may be poker and GAME2 may be Black Jack. For clients P1, P2, P4, P5 the corresponding accounts A1, A2, A4, A5 are handled by the respective game logic G1, G2 as in the first scenario described with reference to FIG. 1. However, for client P3 things become more complicated, since account A3 will now be updated by both game logics G1, G2. In addition to the problems mentioned in connection with the first scenario, this adds the further complication that during an update by, for example game logic G1, account A3 may be locked for updates by game logic G2. This may increase the waiting times for the game logics further, as compared to the first scenario. The problem becomes even worse as more clients participate in more than one game and as the number of parallel game sessions per client is increased. In practice it is not uncommon that a client participates in up to 10 parallel game sessions.

Figure 4:
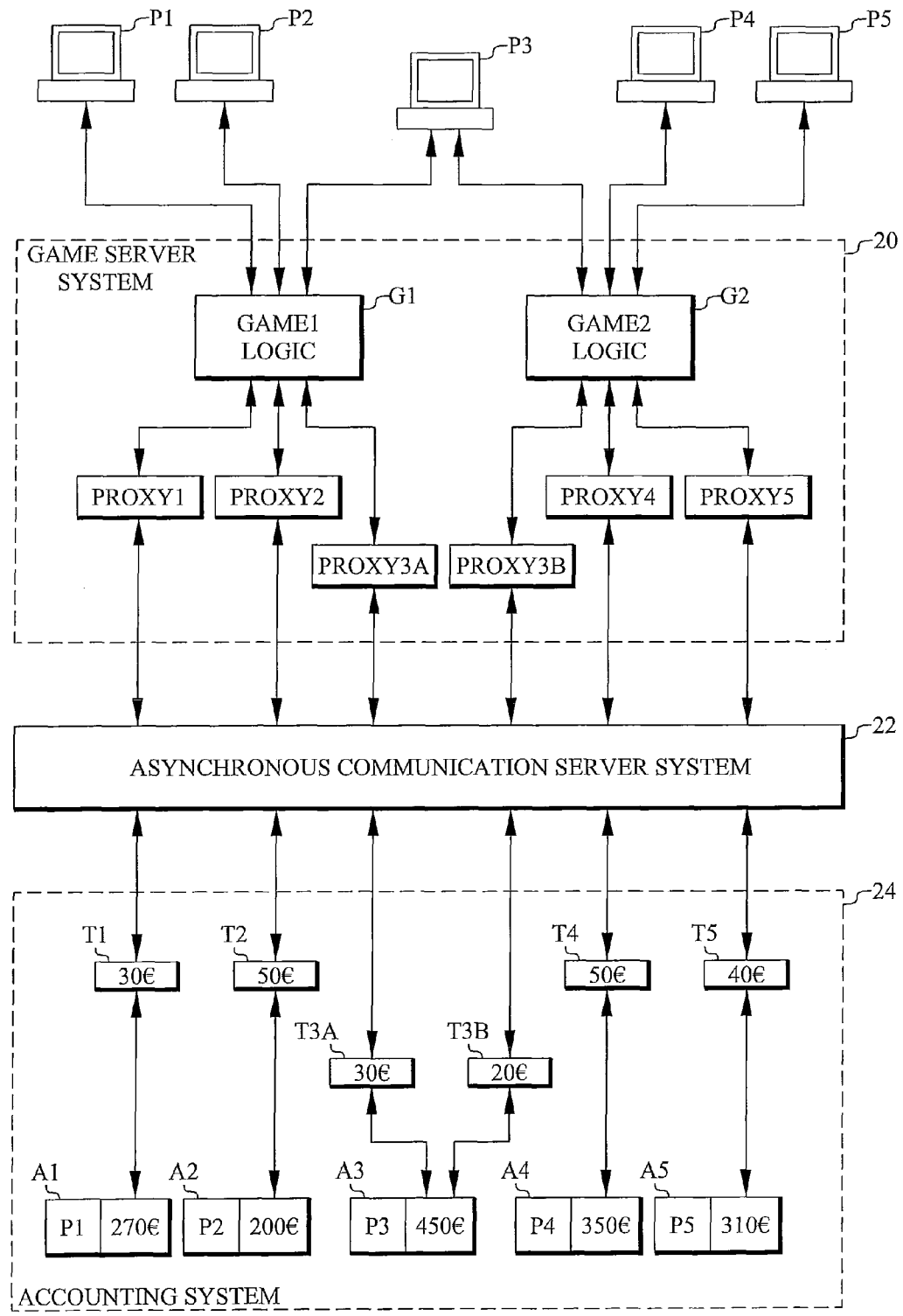
FIG. 4 is a block diagram of a gaming system including an example embodiment of the client account managing arrangement.

FIG. 4 is a block diagram of a gaming system including an example embodiment of the client account managing arrangement. Clients P1, P2, P4, P5 are handled in the same way as in the embodiment of FIG. 2, i.e. they are each associated with an individual temporary reservation account over corresponding proxies and the asynchronous communication server system 22. The difference is only that clients P1, P2 and P4, P5 belong to different games associated with game logics G1 and G2, respectively. However, the essential difference is the arrangement for handling client P3, which in this scenario participates in both games. In this case there is one proxy PROXY3A connected to game logic G1 and one proxy PROXY3B connected to game logic G2. Each proxy is over the asynchronous communication server system 22 connected to a temporary reservation account T3A and T3B, respectively. Both temporary reservation accounts T3A, T3B are connected to the single permanent account A3. In general there is one proxy and a corresponding temporary reservation account for active each client/game session combination. An advantage of this feature is that it eliminates the risk of finding a temporary reservation account locked due to an update performed by another game logic, which could happen if all game sessions associated with a client were associated with the same temporary reservation account (especially if the client participates in many games at the same time).

During an ongoing game session each client's temporary reservation account has a proxy that preferably resides near (within a few router hops from) the game logic to reduce delays. In the embodiments of FIGS. 2 and 4 this is accomplished by implementing the proxies directly in the game server system 20. However, if the asynchronous communication server system 22 is also near the game logic (in the sense described above), an alternative embodiment is to implement the proxies in this system instead.

The game server system 20 may be implemented on one or several game servers (computers). One server may provide the game logic for one or several game sessions (GAME1, GAME2, . . . ) in software.

The asynchronous communication system 22 is preferably implemented on one or several messaging servers (computers). However, in principle it is feasible to implement it directly on the game servers.

The accounting system 24 is usually geographically separated from the game server system 20 and the asynchronous communication system 22. Although the logic of the accounting system may be deployed in multiple servers, the database including the permanent accounts should preferably be a single instant.

It will be understood by those skilled in the art that various modifications and changes may be made without departure from the scope of the claims.

The invention claimed is:

1. A client account managing system for an online game, the system comprising:
   a game server executing a game logic, the game logic configured to manage clients participating in at least one game session;
   an asynchronous communication server communicably connected to the game server; and
   an accounting server being communicably connected to the asynchronous communication server, the accounting server storing a permanent account for each of the clients participating in the at least one game session, and the accounting server being configured to:

create a temporary reservation account for each client/game session combination provided by the game logic, transfer money from the permanent accounts to the respective temporary reservation accounts as the clients start to participate in the at least one game session, update each temporary reservation account with transactions for the client/game session combination associated with the temporary reservation account, transfer remaining money from the temporary reservation accounts to the respective permanent accounts as clients end their participation in the at least one game session, and close the temporary reservation account for each ended client/game session combination;

wherein, proxies, one for each client/game session combination, are provided on the game server or the asynchronous communication server, and the proxies are configured to communicate with the game logic, and wherein when updating each temporary reservation account with transactions for the client/game session combination associated with the temporary reservation account, the game logic indirectly communicates the transactions to the accounting server via the corresponding proxy for the client/game session combination and the asynchronous communication server.

2. The system of claim 1, wherein the proxies are provided on the game server.

3. The system of claim 1, wherein the proxies are provided on the asynchronous communication server.

4. The system of claim 1, wherein the proxies, temporary reservation accounts, and asynchronous communication server decouple the permanent accounts from the game logic executing on the game server.

5. A method for operating a client account managing system for an online game, the system comprising a game server executing game logic that manages clients participating in at least one game session and an accounting server storing a permanent account for each of the clients participating in the at least one game session, the method comprising:

establishing proxies, one for each client/game session combination, wherein the proxies are provided on the game server or an asynchronous communication server that is communicably connected to the game server and the accounting server;

the accounting server:

creating a temporary reservation account for each client/game session combination provided by the game logic, transferring money from the permanent accounts to the respective temporary reservation accounts as the clients start to participate in the at least one game session, updating each temporary reservation account with transactions for the client/game session combination associated with the temporary reservation account, transferring remaining money from the temporary reservation accounts to the respective permanent accounts as clients end their participation in the at least one game session, and closing the temporary reservation account for each ended client/game session combination;

wherein when updating each temporary reservation account with transactions for the client/game session combination associated with the temporary reservation account, the game logic indirectly communicates the transactions to the accounting server via the corresponding proxy for the client/game session combination and the asynchronous communication server.

6. The method of claim 5, wherein the proxies, temporary reservation accounts, and asynchronous communication server decouple the permanent accounts from the game logic executing on the game server.

7. The method of claim 5, wherein the proxies are provided on the game server.

8. The method of claim 5, wherein the proxies are provided on the asynchronous communication server.

9. An accounting server for use in a client account managing system, the client account managing system including a game server executing a game logic configured to manage clients participating in at least one game session, an asynchronous communication server communicably connected to the game server and the accounting server, and proxies, one for each client/game session combination, provided on the game server or the asynchronous communication server, the accounting server comprising a processor configured to:

store permanent accounts, one for each of the clients participating in the at least one game session;

create a temporary reservation account for each client/game session combination provided by the game logic;

transfer money from the permanent accounts to the respective temporary reservation accounts as the clients start to participate in the at least one game session;

update each temporary reservation accounts with transactions for the client/game session combination associated with the temporary reservation account, transfer remaining money from the temporary reservation accounts to the respective permanent accounts as clients end their participation in the at least one game session; and close the temporary reservation account for each ended client/game session combination;

wherein when updating each temporary reservation account with transactions for the client/game session combination associated with the temporary reservation account, the game logic indirectly communicates the transactions to the accounting server via the corresponding proxy for the client/game session combination and the asynchronous communication server.

10. The accounting server of claim 9, wherein the proxies are provided on the game server.

11. The accounting server of claim 9, wherein the proxies are provided on the asynchronous communication server.

12. The accounting server of claim 9, wherein the proxies, temporary reservation accounts, and asynchronous communication server are decoupled from the permanent accounts.

* * * * *